United States Patent [19]

Turley et al.

[11] 4,113,541
[45] Sep. 12, 1978

[54] METHOD OF BONDING USING AN IMPROVED EPOXY COMPOSITION CONTAINING CHLORINE CONTAINING POLYOLS

[75] Inventors: Richard J. Turley, Orange; Alexandre Ozolins, New Haven, both of Conn.

[73] Assignee: Olin Corporation, New Haven, Conn.

[21] Appl. No.: 807,456

[22] Filed: Jun. 17, 1977

Related U.S. Application Data

[62] Division of Ser. No. 625,903, Oct. 28, 1975, Pat. No. 4,052,349.

[51] Int. Cl.$^2$ .............................................. C08G 59/62
[52] U.S. Cl. ....................................... 156/330; 260/83; 528/99; 528/110; 528/111

[58] Field of Search ................... 260/47 EC, 9, 2 EC, 260/47 EP, 2 EP; 156/330

[56] References Cited

U.S. PATENT DOCUMENTS

| | | | |
|---|---|---|---|
| 2,951,829 | 9/1960 | Chiddix et al. | 260/78.4 |
| 3,720,639 | 3/1973 | Griffith | 260/33.4 |
| 4,007,079 | 2/1977 | Turley et al. | 156/330 |
| 4,007,160 | 2/1977 | Turley | 260/47 EC |

Primary Examiner—Harold D. Anderson
Assistant Examiner—E. A. Nielsen
Attorney, Agent, or Firm—Robert J. Feltovic; Thomas P. O'Day

[57] ABSTRACT

An improved method of bonding is disclosed using an epoxy resin composition which incorporates a select group of chlorine-containing polyols.

12 Claims, No Drawings

METHOD OF BONDING USING AN IMPROVED EPOXY COMPOSITION CONTAINING CHLORINE CONTAINING POLYOLS

This application is a division of application Ser. No. 625,903, filed Oct. 28, 1975, now U.S. Pat. No. 4,052,349. The invention relates to a method of bonding using an improved epoxy resin composition as an adhesive.

Various epoxy resins have been known in the prior art. Widely used such resins include the glycidyl ethers which are prepared, for example, by reacting an epihalohydrin with hydroxylated compounds. In the presence of a catalyst, these resins cure into solid materials that are commonly used in the manufacture of coatings, molding compositions and adhesives.

It has also been taught in the art to prepare halogen-containing epoxy resins which exhibit resistance to burning. To this end, U.S. Pat. No. 3,496,120 discloses the preparation of polyether epoxide compositions by reacting together an epihalohydrin, a polyol and a halogenated alkylene oxide such as 4,4,4-trichloro-1,2-epoxybutane. The polyepoxide products of such a reaction are then dehydrohalogenated to yield resinous materials which can be cross-linked into hard plastics that are said to be non-burning.

Further according to the prior art, epoxy adhesive compositions have been prepared incorporating halogenated hydrocarbons. Thus, Russian Pat. No. 191,021 teaches the use of chlorinated polyethylene to improve the bonding strength of epoxy adhesives.

Now an improvement has been found in formulating epoxy resins which on curing exhibit improved physical properties. The improvement is in adding to the epoxy resin a select chlorine-containing polyol as described in detail hereinbelow. Thus, an improved, liquid, curable epoxy composition is provided which comprises (a) an epoxy resin having more than one α-epoxy group per molecule, (b) a curing agent for the resin, and (c) a chlorine-containing polyol.

Any of the variety of prior art liquid, curable epoxy resins having more than one α-epoxy group in the molecule may be used in the composition of the invention. However, it is generally preferred to employ the glycidyl ether type epoxy resins. These are generally prepared by reacting an epihalohydrin with a polyhydroxy compound in a liquid caustic medium. Such and other epoxy resins and their preparation are described in detail in H. Lee and K. Neville, *Handbook of Epoxy Resins*, McGraw-Hill, Inc., New York (1967). The entire disclosure of this book is incorporated herein by reference.

Illustrative glycidyl type epoxy resins include the glycidyl ethers of bisphenols such as bisphenol A, the glycidyl ethers of mononuclear di- and trihydric phenols, the glycidyl ethers of aliphatic polyols, the glycidyl ethers of novolac resins, and the glycidyl ethers of polynuclear phenols. Because of their ready commercial availability, the glycidyl ethers of bisphenol-A are especially preferred such as may be represented by the structural formula

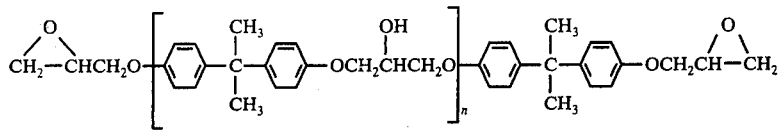

wherein $n$ represents a number of 1 or less.

The epoxy resin composition of the invention includes a curing agent or catalyst. Here again any such material known in the prior art to be an effective curing agent for a particular epoxy resin as defined herein or for any generic group of epoxy resins may be employed where feasible or desirable. This may include two or more ingredients which act together as a curing system for the epoxy resin. The curing agent, when mixed with the epoxy resin, serves to transform it from the liquid or thermoplastic state to a hard thermoset solid; and, depending on the nature of the particular curing agent, this transformation occurs by the curing agent acting as a catalyst to promote the curing process, or the curing agent may participate in a reaction with the epoxy resin thereby becoming chemically bound into the resin chain.

Illustrative epoxy resin curing agents include basic materials, such as the Lewis bases, the inorganic bases, the primary and secondary amines, and the amides, and acidic materials such as the Lewis acids, the carboxylic acid anhydrides, and the dibasic organic acids. These and other curing agents are described in detail in the above-cited Handbook of Epoxy Resins.

The curing agent is employed in any suitable proportion which is effective in curing the epoxy resin. As is well known in the art, such proportion varies considerably depending on the chemical nature of the curing agent and on the rate of curing which is desired. Therefore, a specific proportion which is applicable in the case of one curing agent may represent an insufficient or excessive level, as the case may be, when a different curing agent is used. Thus the term "effective amount", as used in the specification and claims herein with reference to the curing agent, is intended to encompass any such proportion of a particular curing agent or group of curing agents which may suitably be used to bring about curing of the epoxy resin. For general illustration, depending on the particular material used, the curing agent may be employed in a proportion from about 4 to about 100 parts per 100 parts by weight of the epoxy resin.

In addition to the curing agent, if desired other ingredients may be added to the epoxy resin, such as taught in the prior art, in order to modify the properties of the resin or to achieve certain objectives in connection with its processing and commercial utilization. This includes, for example, fillers, solvents or diluents, resin modifiers and plasticizers.

Pursuant to the invention, improved physical properties are imparted to the epoxy resin by incorporating or mixing therewith a select chlorine-containing polyol characterized by having at least one (2,2-dichlorovinyl)ethylene group in the polyol chain. The (2,2-dichlorovinyl)ethylene group may be represented by formula I as follows:

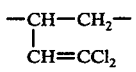

$$\begin{array}{c} -\text{CH}-\text{CH}_2- \\ | \\ \text{CH}=\text{CCl}_2 \end{array} \quad \text{I}$$

These chlorine-containing polyols usually contain an average of about 2–8, preferably 2–4, and more preferably 2–3, hydroxy groups. They vary in molecular weight over a wide range such as from about 360 to about 9,600 and preferably about 860–5,000. Furthermore, as indicated above, a critical feature of these polyols is that they must contain at least one (2,2-dichlorovinyl)ethylene group in the molecule. Illustratively, depending on the number of hydroxy groups in the polyol, it may contain about 1–40, and preferably about 2–30 (2,2-dichlorovinyl)ethylene groups in the molecule. In accordance with the more preferred embodiments of the invention, the chlorine-containing polyol should contain about 1–6, and still more preferably about 2–5, (2,2-dichlorovinyl)ethylene groups per every hydroxyl group.

The chlorine-containing polyols used according to the invention can be prepared by condensing a polyhydroxy initiator with 4,4-dichloro-3-butene-1,2-epoxide or a mixture thereof with a halogen-free epoxide using conventional random or step-wise oxyalkylation techniques. An alternative route is a two-step method which comprises (1) condensing 4,4,4-trichloro-1,2-epoxybutane with a polyhydroxy initiator to form an intermediate chlorinated polyol condensate and then (2) dehydrochlorinating the condensate. This two-step method, which represents a preferred route for preparing the chlorine-containing polyols, is described in more detail hereinbelow.

In utilizing the two-step method, the 4,4,4-trichloro-1,2-epoxybutane, which is first condensed with the polyhydroxy initiator, may be used in purified form or as a crude product of the dehydrohalogenation of 4,4,4-trichloro-2-halobutanol. Such crude product is described in U.S. Pat. No. 3,847,844, issued Nov. 12, 1974 to Fuzesi et al, the entire disclosure of which is incorporated herein by reference. It is thus to be understood that the term "4,4,4-trichloro-1,2-epoxybutane", as used in the specification and claims herein, includes either form of this compound. For brevity, the 4,4,4-trichloro-1,2-epoxybutane is hereinafter referred to as "TCBO".

The TCBO may be used alone or, pursuant to one embodiment of the invention, in combination with varying proportions of a halogen-free epoxide such as ethylene oxide, propylene oxide, and butylene oxide. Pursuant to this embodiment, the halogen-free epoxide, of which ethylene oxide is most preferred, may be used concurrently with the TCBO, i.e., random oxyalkylation, or step-wise, i.e., block oxyalkylation before or after the reaction of the TCBO with the polyhydroxy initiator. These random and step-wise oxyalkylation techniques are well known and conventionally used in the prior art. In general, step-wise oxyalkylation is preferred wherein the TCBO is first condensed with the polyhydroxy initiator, the resulting condensate being thereafter "topped" with the halogen-free epoxide.

The polyhydroxy initiator used to prepare the chlorine-containing polyol can be any compound having from 2 to 8 hydroxy groups or a mixture of two or more such compounds. Illustrative polyhydroxy compounds include ethylene glycol, propylene glycol, butylene glycol, glycerin, trimethylolpropane, triethylolpropane, sorbitol, pentaerythritol, dextrose (hydrous or anhydrous), sucrose, methyl glucoside, mixtures thereof and the like. In accordance with the preferred embodiments of the invention, the polyhydroxy initiator contains an average of 2–4, and still more preferably 2–3, hydroxy groups. Illustrative such initiators are ethylene glycol, propylene glycol, butylene glycol, glycerin, trimethylolpropane, triethylolpropane and mixtures thereof.

Although the condensation reaction of the TCBO with the polyhydroxy initiator may proceed in the absence of a catalyst, the use of a catalyst is preferred. Any acidic catalyst which is known in the art to promote this type of a reaction may be used. A large variety of such catalysts, as illustrated by the Lewis acid catalysts, can be used. These include, for example, boron trifluoride and its etherate derivatives, ferric chloride, ferrous chloride, stannic chloride, titanic tetrachloride, antimony pentachloride, aluminum chloride, aluminum bromide, hydrogen fluoride, triethyl aluminum, zinc chloride, zinc bromide, tetrabutyl titanate and so forth. The use of boron trifluoride and its etherate derivatives is particularly perferred. Small or catalytic proportions of the acid catalyst are employed as will serve to promote the condensation reaction.

The acid catalyzed condensation is carried out at any suitable temperature which is effective in bringing about reaction of the TCBO with the polyhydroxy initiator without otherwise adversely affecting the reaction or product thereof. Temperatures within the range of 30°–200° C are illustrative. In effecting the condensation reaction, such relative proportions of reactants are employed as to provide at least one mole of TCBO per mole of polyhydroxy initiator. In accordance with the more preferred embodiments of the invention, the TCBO is employed in a proportion of about 1–6, and still more preferably about 2–5, moles per each hydroxy group in the polyhydroxy initiator. Where a halogen-free epoxide is also used, the proportion of this can be varied over a wide range such as from about 0.5 to about 10 and preferably about 0.8–3, moles per every mole of TCBO that is used.

As a result of the condensation of the polyhydroxy initiator with TCBO or mixture thereof with a halogen-free epoxide, an intermediate chlorinated polyol condensate is obtained. This is then subjected to dehydrochlorination by reaction with a base such as sodium or potassium hydroxide. Preferably the base is employed in a proportion of one mole per every mole of TCBO that has been condensed with the polyhydroxy initiator. It is also preferred to carry out the reaction in the presence of an organic solvent such as methanol. Due to the exothermic nature of the reaction, the addition of the base to the intermediate polyol condensate is effected gradually. Also it may be advantageous to use a cooling bath to more effectively control the temperatures of the reaction which is preferably effected at a temperature of about 20°–40° C.

Upon completion of the dehydrochlorination, a reaction product mixture results which will be comprised of the chlorine-containing polyol, salt, e.g., NaCl or KCl, water and solvent if such was used. The salt can be removed by a simple water wash. The remaining mixture, after being neutralized with dilute acid, is then stripped of volatiles, i.e., by-product water and solvent if such was used, leaving a chlorine-containing polyol product which would be ready for use according to the invention.

The chlorine-containing polyol may be used in any proportion which is effective in improving the physical properties of the cured epoxy resin. For example, such a proportion may range from about 5 to about 400, and preferably about 25-250 parts per every 100 parts of the epoxy resin; and pursuant to the most preferred embodiments of the invention the chlorine-containing polyol is employed in a proportion which ranges from about 35 to about 220 parts per every 100 parts by weight of the epoxy resin.

In preparing the epoxy composition of the invention, the chlorine-containing polyol and the curing agent are simply added to, and mixed with, the epoxy resin. Thereafter the mixture is allowed to cure into a hard substance. Ordinarily such curing will take place at room temperature, so that heating is not necessary, although the use of heat may be preferred in actual practice in order to enhance or speed up the curing process.

Upon curing, the epoxy composition of the invention exhibits reduced combustibility and substantially improved adhesive bonding properties. As such it is used to advantage, according to the method of the invention, as an improved, highly stable adhesive in bonding two surfaces together.

In utilizing the epoxy composition as an adhesive pursuant to the method of the invention, any suitable prior art bonding technique may be used. Furthermore, by virtue of its highly improved adhesive characteristics, the epoxy composition described herein can be used to bond together a wide variety of solid materials.

The following description is provided by way of illustrating the improved method of the invention as used for example in adhesively bonding two surfaces together. The surfaces are preparatorily cleaned and dried in order to remove any dirt, moisture or loose particles that may be present thereon. In the case of metallic surfaces, the cleaning step usually also involves a degreasing operation using conventional grease solvents. If desired, the metallic surfaces may further be etched by being suitably immersed in an etching solution and thereafter washed with water and dried.

The next step is to apply the epoxy composition to one or both surfaces, application to both surfaces being generally preferred in order to insure full coverage thereof. A brush or other suitable instrument may be used in applying and spreading the epoxy composition over each surface. Alternatively, the ingredients of the epoxy composition may be applied individually to each surface, these ingredients being thereafter thoroughly mixed together using a spatula or the like. The thickness of the epoxy composition layer which is applied may be varied over a wide range. However, as a practical matter, a thickness of about 0.001-0.1 inch is usually sufficient.

After the epoxy composition has been applied, the surfaces are pressed together firmly such as by using a pressure of about 1-50 psi. Then the epoxy composition is cured by holding the assembly under pressure until a permanent bond is achieved. As noted above, curing may be effected at room temperature or at elevated temperature. However, in this application the use of elevated temperature is preferred, such as about 80°-300° F and more preferably about 100°-250° F; for it has been found that along with speeding up the curing process, the use of elevated temperatures further enhances the strength of the adhesive bond.

The epoxy composition of the invention is also of utility in various other applications which call for the use of epoxy resins. For example, by virtue of its reduced combustibility, it is particularly suited for use in coating combustible materials and in making resin-bonded fibrous panels. It is also useful in numerous potting, casting and molding applications.

The following examples are provided to illustrate the invention. All parts and percentages given are by weight unless otherwise specified. In these examples, the epoxy resin used was a standard, undiluted glycidyl ether of bisphenol-A (DGEBA), product of the Reichold Chemical Company, purchased under the trademark EPOTUF ® and further identified by the numerals "37-140". This material is characterized by the following properties Epoxide equivalent weight - 180-195
Specific gravity - 1.15-1.17
Viscosity - 11,000-14,000 cps. at 77° F.

The curing agent used in the examples was another product of the Reichold Chemical Company, sold under the trademark EPOTUF ® and identified by the numerals "37-622". It is described as a modified polyamine hardener having a specific gravity of 1.01 and a viscosity of 80-150 cps. at 77° F.

Further in the examples, five different polyols are employed to illustrate epoxy resin composition of the invention. All five polyols, which are identified as Polyols A, B, C, D and E, are products of dehydrochlorinating various intermediate chlorinated polyol condensates. These condensates in turn had been prepared by a conventional oxyalkylation method using a boron trifluoride etherate as a catalyst. The identities and relative molar proportions of the reactants used in preparing each intermediate condensate are given below.

| Polyol | Preparation of Intermediate Polyol Condensate |
|---|---|
| A | One mole of glycerin condensed first with 8 moles of TCBO and then with 4 moles of ethylene oxide. |
| B | A mixture, one mole of ethylene glycol and and one mole of dextrose (i.e., α-d-glucose monohydrate), condensed with 4.1 moles of TCBO. |
| C | Eight moles of TCBO condensed with one mole of glycerin. |
| D | One mole of trimethylolpropane condensed first with 12 moles of TCBO and then with 8 moles of propylene oxide. |
| E | Eight moles of TCBO condensed with one mole of ethylene glycol. |

To illustrate the preparation of the chlorine-containing polyol from the intermediate polyol condensate, the following procedure was used in preparing Polyol A, which procedure applies generally to the preparation of the other chlorine-containing polyols. Five hundred grams of the intermediate chlorinated polyol condensate were reacted with 2.7 moles of KOH which was used as a solution thereof in 850 mls. of methanol. The addition of the KOH was gradual and a cooling bath was used so as to maintain a temperature of 20°-30° C. The precipitated KCl was then removed by a water wash, and the remaining reaction product mixture was neutralized by the incremental addition of a dilute HCl solution. Finally the volatile components were removed by stripping at 50° C and 0.6 m.m. of mercury pressure.

EXAMPLE 1

An epoxy resin composition was prepared from DGEBA, polyamine hardener, and Polyol A. For every 100 parts of DGEBA, 19 parts of the hardener and 50 parts of the polyol were used.

The three components were thoroughly mixed together. Immediately thereafter, the mixture was used to bond two aluminum test panels together, which panels had been preparatorily cleaned in order to remove any dirt and lubricant film from the surface thereof. The procedure used to bond the panels together and to thereafter test the strength of the bond was as described in ASTM D 1002-64. Thus the panels were made of aluminum B 209, alloy 2024, T3 temper, and each panel measured 4 inches long by 1 inch wide by 0.064 inch thick. The epoxy resin composition was brushed onto each of the two facing regions of the two panels so as to insure full coverage for the 0.5 inch overlap region prescribed by the above-noted test. After the resin-brushed regions were brought in contact, a weight of 125 grams was placed thereover. This weight was maintained while the epoxy resin was cured at a temperature of 150° F. Thereafter, the force needed to bring about failure of the bond was measured, and the lap shear strength of the bond was calculated. For an average of five duplicate tests, the lap shear strength was 4,400 pounds per square inch.

The above five tests were repeated again except that the temperature used to cure the epoxy resin was 250° F instead of 150° F. The average lap shear strength for the five tests was 5,000 pounds per square inch.

EXAMPLES 2-5

The identical procedure of Example 1 was followed except that other chlorine-containing polyols were used in lieu of Polyol A. The results are outlined in Table I below.

CONTROL TEST

The identical procedure of Example 1 was followed except that no chlorine-containing polyol was included in the epoxy resin composition. The results of this test are also given in Table I below.

TABLE I

| Example No. | Polyol Used | Lap Shear Strength (psi.) | |
|---|---|---|---|
| | | 150° F Curing | 250° F Curing |
| 1 | A | 4,400 | 5,000 |
| 2 | B | 2,600 | 2,500 |
| 3 | C | 3,300 | 3,100 |
| 4 | D | 3,300 | 4,500 |
| 5 | E | 3,800 | 4,000 |
| Control | None | 1,600 | 2,200 |

What is claimed is:

1. In a method of bonding two surfaces together by means of an adhesive, the improvement of employing as said adhesive, a liquid, curable epoxy composition comprised of
   (a) an epoxy resin having more than one α-epoxy group in the molecule,
   (b) a curing agent for said resin, and
   (c) a chlorine-containing polyether polyol having an average of 2-8 hydroxy groups and at least one (2,2-dichlorovinyl) ethylene group in the polyether polyol chain.

2. The method of claim 1 wherein said chlorine-containing polyol is prepared by a method comprising first the condensation of a polyhydroxy initiator with 4,4,4-trichloro-1,2-epoxybutane or a mixture thereof with a halogen-free epoxide to form an intermediate chlorinated polyol condensate and (2) dehydrochlorination of said condensate.

3. The method of claim 2 wherein said polyhydroxy initiator is a mixture of dextrose and ethylene glycol.

4. The method of claim 1 wherein said epoxy resin is a glycidyl ether.

5. The method of claim 4 wherein said chlorine-containing polyol has an average of 2-4 hydroxy groups and about 1-6 of said (2,2-dichlorovinyl)ethylene groups per every hydroxy group.

6. The method of claim 5 wherein said epoxy resin is a glycidyl ether of a material selected from the group consisting of a bisphenol, a mononuclear dihydric phenol, a mononuclear trihydric phenol, a polynuclear phenol, an aliphatic polyol and a novolac resin.

7. The method of claim 6 wherein said chlorine-containing polyol is employed in a proportion of about 25-250 parts per every 100 parts by weight of said resin.

8. The method of claim 7 wherein said chlorine-containing polyol is prepared by a method comprising a first step wherein a polyhydroxy initiator is condensed with 4,4,4-trichloro-1,2-epoxybutane, or a mixture thereof with a halogen-free epoxide, to form an intermediate chlorinated polyol condensate and a second step wherein said condensate is subjected to a dehydrochlorination reaction.

9. The method of claim 8 wherein said chlorine-containing polyol has an average of 2-3 hydroxy groups and contains about 2-5 of said (2,2-dichlorovinyl)ethylene groups per every hydroxy group.

10. The method of claim 9 wherein said epoxy resin is a glycidyl ether of bisphenol-A.

11. The method of claim 10 wherein said first step, in the preparation of said chlorine-containing polyol, comprises condensing a polyhydroxy initiator first with 4,4,4-trichloro-1,2-epoxybutane and then with propylene oxide or ethylene oxide.

12. The method of claim 11 wherein said polyhydroxy initiator is selected from the group consisting of ethylene glycol, propylene glycol, butylene glycol, glycerin, trimethylolpropane, triethylolpropane and a mixture thereof.

* * * * *